INVENTORS:
V. P. GUINN
C. P. BREWER
BY: *[signature]*
THEIR ATTORNEY

May 31, 1960　　V. P. GUINN ET AL　　2,938,860
RADIOACTIVE ANALYSIS OF CRACKING CATALYSTS
Filed March 16, 1956　　　　　　　　　　　2 Sheets-Sheet 2

INVENTORS:
V. P. GUINN
C. P. BREWER
BY: [signature]
THEIR ATTORNEY

United States Patent Office 2,938,860
Patented May 31, 1960

2,938,860

RADIOACTIVE ANALYSIS OF CRACKING CATALYSTS

Vincent P. Guinn, Walnut Creek, and Charles P. Brewer, El Cerrito, Calif., assignors to Shell Oil Company, a corporation of Delaware Filed Mar. 16, 1956, Ser. No. 571,927

9 Claims. (Cl. 208—149)

This invention belongs to the field of catalytic cracking and relates more particularly to measurements which permit to ascertain the behavior of fluidized catalysts in commercial units, and particularly to determine the rates of deactivation of fresh catalysts during use in such units.

The catalysts referred to hereinbelow may be of any desired type, such particularly as catalysts of the silica-alumina acid type. Deactivation, as referred to hereinbelow, relates, among others, to processes of loss of surface area and pore volume resulting from exposure to catalytic cracking conditions.

Normal cracking catalysts consist initially of microspheroidal aggregates of small dense particles, averaging about 50 Angstroms in diameter. About $10^{11}$ to $10^{12}$ of these particles are held together to form each aggregate, in which the particles proper occupy about 40 percent of the space, and the pores or interstices the remaining 60 percent.

If such a catalyst is exposed to steam at moderately high temperatures (400–600° C.), it is found that the larger particles begin to grow at the expense of the smaller ones. This process results in a decrease of the surface area, an increase in the average "pore radius" and very little change in pore volume. This process is usually termed "low temperature steam deactivation" and may occur in the stripping section and reactor of a commercial cracking unit. Generally, the resistance of a catalyst to this type of deactivation increases with the ratio of pore volume to surface area, that is, with increasing pore radius.

A second type of deactivation predominates at high temperatures (about 800° C.) and results in coalescence of the tiny particles within an aggregate. This process results in the simultaneous loss of surface area and pore volume. This type of deactivation, although often termed "thermal deactivation" is more properly designated as "high temperature steam deactivation," and usually predominates in the regenerator of a cracking unit, due to the very high surface temperature reached by the particles during coke burnoff.

It is also found that at extremely high temperatures, a thermal collapse of the catalyst structure may occur even in the absence of steam, and probably involves viscous flow. The temperature at which thermal collapse occurs in vacuo depends primarily on the elementary particle size and the presence of impurities.

Various methods have been developed to study the deactivation of cracking catalysts observed in commercial plants. However, none of these methods has been found to give completely satisfactory results. One of the major difficulties is that the inventory of a full-scale cracking unit, that is, the total mass or amount of the catalyst, is composed of catalyst introduced into the unit at widely different times (so-called equilibrium catalyst), it being impossible to specify the age of any portion thereof and thus to correlate age with particular properties and performance.

Methods have been developed to separate equilibrium catalyst into fractions of different physical properties. The technique is based on pore changes in the catalyst on aging, and on resultant differences in densities.

This may be summarized as follows:

(1) Differences in apparent skeletal density develop in the catalyst as some pores are sealed and become trapped voids. These catalyst particles can be separated from others by simple flotation in liquids of different densities.

(2) Differences in specific pore volume appear as the catalyst is subjected to heat and steam. Fractions of different pore volume are obtained by filling the pores entirely with water, and separating on basis of density, as above.

(3) Differences in average pore radius arise as the catalyst ages in the commercial unit; in general, the pore radius increases with time. A separation based on this change can be made by adding insufficient water to fill all the pores. The water then concentrates in the pores of the smallest radius, and separation by density can again be made.

Application of these techniques has made it possible to carry out fractionation of equilibrium catalyst into fractions of distinctly different properties, such as surface area, skeletal density, pore volume or pore radius, etc. However, although there is good evidence that the fractions of highest pore volume and surface area are the youngest, while those of lowest surface area and pore volume (and highest contamination) are the oldest, there has heretofore been no method for directly effecting such correlation.

Since, in the economic operation of catalytic cracking units, such correlation is essential in order, among other objects, to establish a basis for assaying and evaluating the behavior of the many available catalysts, it is an object of this invention to provide for this correlation a method involving the use of highly developed catalyst fractionation methods in combination with the use of radioactive tracer materials such as radioactive isotopes.

It is also an object of this invention to provide a method for effecting measurements of the type referred to hereinabove with the aid of radioactive materials or isotopes especially suitable for such use, such particularly as cerium-144, chromium-51 and scandium-46.

It is also an object of this invention to provide a method whereby said isotopes can be distributed or adsorbed with optimum uniformity over the entire surface of the catalyst to be tagged by said isotopes.

It is also an object of this invention to provide a method according to which said isotopes can be used either singly or simultaneously for tagging and analyzing the behavior of a catalyst or a plurality of catalysts.

It is also an object of this invention to provide for a great accuracy in the required measurements through the use of highly sensitive analytical tools, such as scintillation counters, pulse height analyzers, and the like.

These and other objects of this invention will be understood from the following description taken with reference to the attached drawings, wherein.

The catalyst deactivation measurements according to the method of the present invention involve the basic steps of tagging a relatively small amount of catalyst with a radioactive material, injecting the tagged material into an operating catalytic unit, withdrawing samples of the equilibrium catalyst from said unit at a predetermined time or times, separating each sample into a desired number of fractions of different physical properties, such as surface area and pore size, by sink float or any other fractionating methods, and counting or measuring the radioactivity of each fraction to correlate the physical properties of each fraction with its age. This procedure makes it imperative to use highly sensitive radioactivity counting or measuring methods and apparatus. First, the use of such method and apparatus permits avoiding the use of relatively hazardous quantities of tagging isotopes. Second, the separation of the tagged catalysts into fractions of different surface area, skeletal density, pore size, etc. is a time consuming operation, which makes it desirable to avoid having to prepare large samples. In order that the radioactivity of relatively small samples may be counted or measured with a high degree of accuracy, it has been found preferable to use the extremely sensitive detecting systems shown in Figs. 1 and 2.

Figure 1:
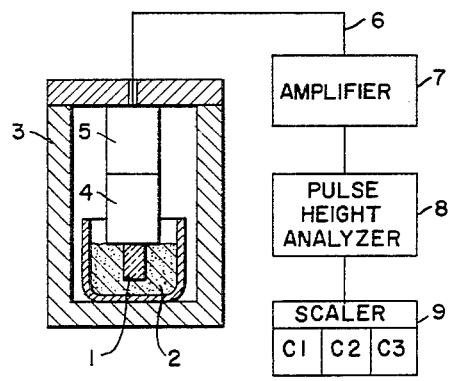
Figs. 1 and 2 are diagrammatic views, partly in cross-section, of scintillation counters and auxiliary apparatus used in accordance with the present invention.

Fig. 1 diagrammatically shows a dip-type scintillation counter together with necessary auxiliary equipment. A scintillation crystal, such preferably as a thallium activated sodium iodide crystal (NaI(Tl) crystal) denoted by the numeral 1 is inserted or dipped into a radioactive sample 2 held, for example, in a glass jar within a suitably shielded container 3. The crystal 1, which is preferably made as large as possible, e.g., a 2 to 5-inch dia. crystal, may conveniently be built as a part of a probe unit comprising a photomultiplier tube 4 and a cathode follower amplifier 5. The scintillation probe is connected by a conductor 6 to an indicating or recording circuit which may comprise an amplifier 7, a pulse height analyzer 8, and a scaler 9, preferably a multiple scaler having a plurality of channels, such as shown at C1, C2 and C3.

Figure 2:
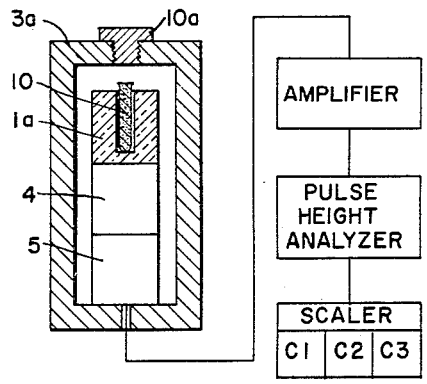

Fig. 2 shows a similar scintillation counter of the well-type, wherein the crystal 1a, also preferably a large NaI(Tl) crystal, is provided with an axial well 10, adapted to accommodate a small quantity of a catalyst sample. Thus, the well of a 2-in. diameter crystal may accommodate a quantity such as 5 g. of the sample. The unit is shielded within a container 3a impervious to gamma rays, which may be closed by a plug 10a.

It has been found that the sensitivity of the detecting devices described above is such that they can be used to detect amounts as small as one millicurie of a typical gamma emitter admixed with 60,000 barrels of oil or 8,000 tons of cracking catalyst. It should be noted that the gamma ray detection efficiency of scintillation counters, such as shown in Figs. 1 and 2, is approximately fifty times that of a Geiger-Mueller counter of similar size, due to the higher gamma ray absorption resulting from the high density and high average atomic number of the sodium iodide crystal.

When using well type counters of moderate crystal size, it has furthermore been found of particular advantage to employ low energy gamma emitters, since self-absorption in the sample is small, and gamma absorption by the crystal increases as the gamma ray energy is decreased. This is especially important because, first, the crystal thickness around the sample is only about one-third of that of a solid crystal of the same dimensions, and, second, the gammas entering the crystal are not degraded to lower energies by Compton scattering within the sample to the extent to which they are in the larger samples employed according to the dip counting method. With a 0.1 mev. gamma emitter, it has been found that the overall counting efficiency is about 80 percent. Thus, for example, to attain a 3 percent statistical accuracy with ten minute counts on 5 gram samples, with a well counter having a 200 c.p.m. background, it is necessary to employ 14 mc. of radioactive material in a unit of 500 tons inventory. With a 1 mev. gamma emitter, the overall detection efficiency is about 35%, so that 32 mc. of radioactive material would be required for the same accuracy under the same conditions.

There are however certain factors involved in catalyst deactivation determinations which may make it sometimes desirable to use larger amounts of radioisotopes than those mentioned hereinabove. One is that these determinations may involve the fractionation and counting of samples taken as long as one or more months after the injection of tagged catalyst. In a 500-ton unit operating with a catalyst addition rate of 10 tons per day (to compensate for stack losses, periodic withdrawals, etc.) only 55 percent of the original amount of the radioisotope would remain in the unit after 30 days. If the isotope employed has a 100-day half-life, this percentage is decreased to 45 percent. A second factor is that the initial stack loss rate of fresh catalyst is relatively high, frequently amounting to as much as 20% during the first few days. Thus, in the example cited, it may be advisable to use about 40 mc. of a 0.1 mev. gamma emitter instead of the 14 mc. cited above if it is desired to follow deactivation for one month.

The isotopes used in accordance with the present invention must essentially be non-volatile under the high oxidizing temperatures (of the order of 600° C.) of the regenerator, the high reducing temperatures (of the order of 500° C.) of the reactor, and the high steam temperatures (of the order of 500° C.) of the stripper. Although it is possible to prepare a silica-alumina gel incorporating the desired radioisotope or radioisotopes in the gel structure itself, it is preferred to employ an isotope which can be adsorbed on the surface of a commercially available cracking catalyst. It is also preferred that said isotope be a gamma emitter of moderate half life, for example, one measurable in weeks.

Furthermore, it is important to select for use according to this invention an isotope capable of being adsorbed uniformly over the entire surface area of the fresh catalyst to be tagged. If this condition is not satisfied, catalyst particles are found to contain more isotope on the outer portion of the particle surface than on the surfaces forming the walls of the inner pores. This condition results in a disproportionate loss of radioactivity as the catalyst undergoes attrition in the catalytic cracking unit, the fines produced being rapidly lost out of the stack.

It is likewise important that the isotope be available in at least moderately high specific activity in order that the amount of the element adsorbed on the catalyst surface be insufficient to produce any change in the catalytic properties of the tagged material. It is well known that a number of metals, at concentrations of the order of 5–20 parts per million by weight, or higher, will alter the cracking and regeneration properties of silica-alumina catalysts, thus possibly changing also their rate of deactivation in use. In order to tag or label 10 lbs. of catalyst with 40 mc. of isotope without exceeding a metal content of 5 p.p.m., an isotope specific activity preferably in excess of 1700 mc./g. is therefore required. Larger quantities of catalyst can be tagged, or several smaller preparations can be combined, if necessary, in cases where high specific activity supplies are not available.

It has been found that especially satisfactory results can be achieved according to the present invention by using the following isotopes, whose essential properties are tabulated hereinbelow:

| Isotope | Half Life, Days | Principal Gamma Ray, Mev. | Max. Spec. Activity, mc./g. | Approximate Present Cost Per Mc. ($) |
| --- | --- | --- | --- | --- |
| Cerium—144 | 275 | 0.13 | Carrier-free | 1.00 |
| Chromium—51 | 28 | 0.32 | ~25,000 | 5.00 |
| Scandium—46 | 85 | 0.89, 1.12 | 5,000 | 3.00 |

Cerium-144 emits one 0.17 mev. $E_{max}$ beta particle and one 0.13 mev. gamma ray photon in each of about 40 percent of its disintegrations; in the other 60 percent, it emits only 0.30 $E_{max}$ betas. The daughter of $Ce^{144}$ is also radioactive ($Pr^{144}$), decaying with a 17-minute half-life to stable $Nd^{144}$ and emitting essentially only 3.0 mev. $E_{max}$ betas. Chromium-51 decays by K-electron capture, going directly to the ground state of stable $V^{51}$ in 92 percent of its disintegrations, and to an excited $V^{51}$ state in 8 percent of its disintegrations. This 8 percent path results in the emission of the 0.32 mev. gammas which are detected (the $V^{51}$ X-rays are too low in energy to be detected by the counter). Scandium-46 decays to stable $Ti^{46}$, emitting essentially one 0.36 mev. $E_{max}$ beta particle and two gamma ray protons (0.89 and 1.12 mev. energies) per disintegration.

These three isotopes have been found to be adsorbed strongly onto the surface of either fresh or equilibrium silica-alumina cracking catalyst from an acidic aqueous solution of the trichlorides, the term equilibrium catalyst being used, as explained hereinabove, to denote plant-regenerated catalyst which forms the inventory of a commercial catalytic cracking installation and which consists of catalyst particles ranging in age from a few minutes to several months and having an average surface area of about 1000 square meters per gram. Catalyst tagged with these isotopes does not show any loss of radioactivity when heated in air at 1000° C. for two hours, indicating that the adsorbed isotopes are non-volatile under high temperature oxidizing conditions.

Uniform distribution of these isotopes over the entire catalyst surface can be achieved in various ways. Scandium-46 distributes itself fairly uniformly over the catalyst if the latter is merely stirred for several hours with a small excess of an almost neutral aqueous solution of $ScCl_3$ having a pH value of about 6.

Two methods have been developed in accordance with the present invention whereby a more highly uniform distribution of scandium-46 can be achieved. The first method consists in complexing the scandium ion with versene (the disodium salt of ethylene diamine tetracetic acid). The second method consists in using the hydrogen ion as a competing ion for adsorption at pH values ranging from 2 to 5. Either of these methods prevents the rapid adsorption of the scandium ion on the catalyst pore walls as the solution enters the pores, thus allowing time for the isotope ion to reach the inner pores before the solution is depleted.

When using the versene method, care should be used to control the pH of the solution very closely. Unless this is done, the scandium ion tends to complex so well with the versene that it may fail to adsorb on the catalyst. When the hydrogen ion impregnation method is used, most of the adsorption occurs during the first hour, the process being about 99 percent completed after 24 hours' stirring. Similar uniform distributions are achieved with other isotopes, scandium-46 giving however the most satisfactory results in this regard.

Figure 3:
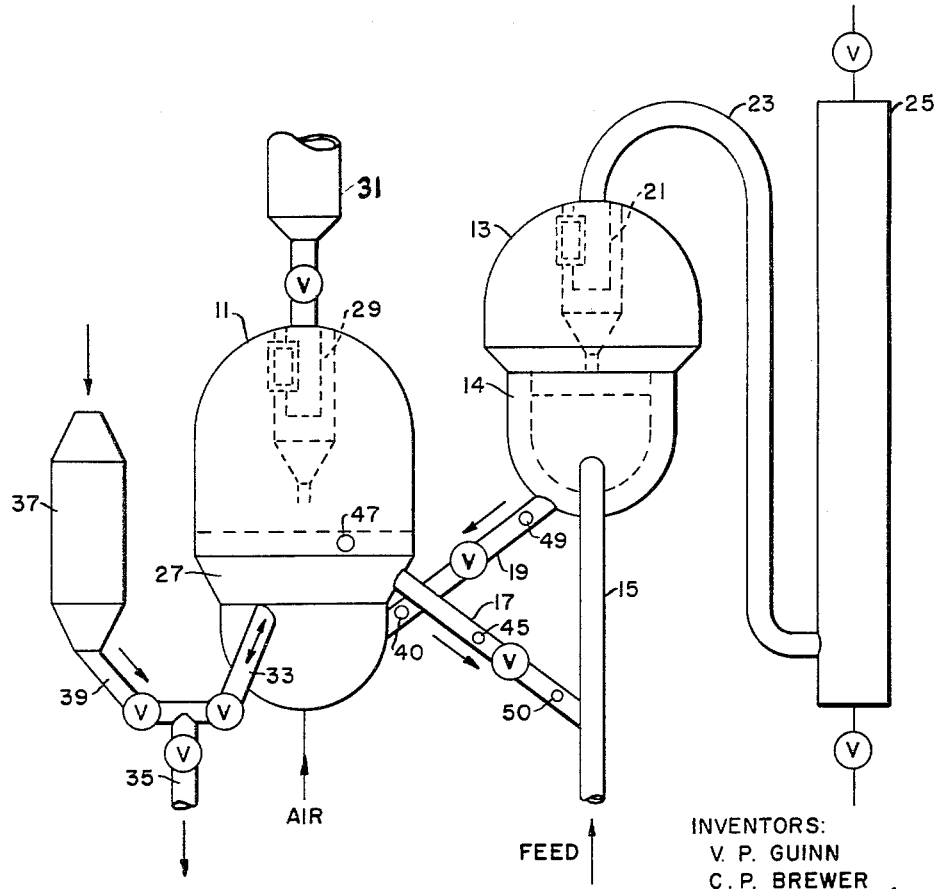
Fig. 3 is a diagrammatic view of a typical catalytic cracking unit.

The method of the present invention will now be described in its application to a catalytic cracking unit such as shown in Fig. 3. This unit, which may operate with a total catalyst inventory such, for example, as 850 tons, comprises a regenerator 11 containing about 600 tons of the catalyst, a reactor 13, holding about 170 tons, and a stripper 14 holding about 80 tons, these figures including the relatively small amounts contained in the risers and standpipes such as shown at 15, 17, 19, etc. The hydrocarbon feed enters the reactor 13 continuously through the pipe 15, and undergoes cracking therein at a temperature of about 500° C. over a bed of fluidized cracking catalyst. The product vapors pass continuously overhead, being directed through cyclone separators 21, where the entrained catalyst particles drop out, and pipe 23 into the product fractionation system diagrammatically indicated by a tower 25. During the cracking process a considerable amount of coke, that is, high molecular weight polymeric hydrocarbons, of the order of one or two percent by weight, forms on the catalyst particles in the zone of the reactor 13. This catalyst, referred to as spent catalyst, continuously spills over into the stripper 14, where it is contacted with steam at a temperature of about 500° C. The stripping operation serves to vaporize some of the semi-volatile polymeric material out of the pores of the spent catalyst, thereby decreasing the amount of coke to be burnt off in the regenerator 11. The stripped catalyst then moves downward through the dense phase standpipe 19 into the bottom part of the regenerator 11. In the regenerator, the stripped catalyst is continuously contacted with air at a temperature of about 600° C., an air rate of about 70,000 std. ft.$^3$/min. being employed. In the fluidized dense phase zone 27 of the regenerator 11, the coke is burned off the catalyst to the point that regenerated catalyst leaving said zone through pipe 17 contains only a small amount, for example, less than 1 percent carbon. The regenerated catalyst descending through pipe 17 is continuously lifted into the reactor 13 by the incoming feed vapors in pipe 15, thus completing the catalyst circulation path. The flue gas leaving the regenerator 11, like that leaving the reactor 13, passes through a system of cyclones indicated at 29, to drop out entrained catalyst, and then out to the atmosphere through a stack 31. In spite of the cyclones 21 and 29, the rate of loss of catalyst through the pipe 23 and chiefly through the stack 31 may amount to about 10 tons a day. In order to maintain the catalytic activity approximately constant, additional catalyst is periodically withdrawn from the regenerator through pipes 33 and 35 at an average rate of 5 tons per day, and fresh catalyst is added at a rate of about 15 tons per day from a catalyst storage hopper 37 through pipes 39 and 33, thereby establishing catalyst equilibrium conditions for the particular unit shown in Fig. 1. Catalyst circulation in said unit is continuous at a rate of about 35 tons per minute, while feed, steam and air are continuously supplied to the reactor 13, stripper 14 and regenerator 11, through the connections shown in the drawing. The pressures throughout the unit are atmospheric to 2 atm. gauge, and the fluidized dense beds operate at densities of about 30 to 40 lbs./ft.$^3$, while the density of the mass in the upper parts of the reactor and regenerator and in the pipes, risers, etc. is about 5 to 15 lbs./ft.$^3$.

*Example I*

Figure 4:
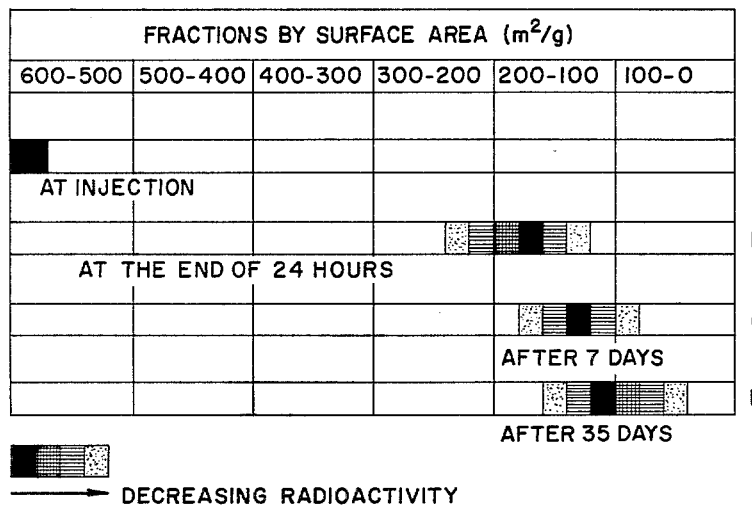
Fig. 4 is a diagram graphically illustrating the gradual deactivation of the catalyst in a commercial cracking unit.

To study catalyst deactivation, 100 lbs. of a fresh catalyst of a type similar to that being added to the unit were tagged with 35 millicuries of scandium 46 and injected into the reactor 13 at a suitable point such as 45 throughout a period of 24 hours while effecting normal slurried catalyst addition. Samples of inventory catalysts were thereafter taken from the system, suitable points for such withdrawals being for example such as shown at 47, 49, etc. Withdrawals of samples were made at predetermined periods, such for example as at the end of the injection period, 7 days later and 35 days later, although different periods may equally well be selected. The samples obtained at each withdrawal were fractionated into a plurality of fractions having different surface area and pore volume and also different cracking characteristics. Fractionation can readily be effected by sink-float methods such, for example, as described in U.S. Letters Patent 2,483,372; 2,631,968; 2,699,256; etc. The radioactivity of the fractionated samples was then counted or measured by means of scintillation counter apparatus such as shown in Figs. 1 or 2. Taking a case where the fresh tagged catalyst had a surface area of about 600 sq. meters per gram, and the fractionation was carried into 6 fractions of 600–500, 500–400, 400–300, 300–200, 200–100 and 100–0 square meters per gram surface area (each fraction being capable of further subdivisions into subfractions), Fig. 4 shows in horizontal column A the theoretical case of fractionation applied to the tagged catalyst being introduced into the system. Since, as stated above, all of that material had a surface area of 600 sq. m./g., all the radioactivity is confined in the 600–500 sq. m./g. fraction (the material content and the radioactivity of all other fractions being, of course, zero). Column B shows conditions at the end of 24 hours. It will be seen that in this case the greatest radioactivity is shown by fractions having an average surface area of about 160 sq. m./g. Since all of the original tagged or radioactive catalyst had a surface area of 600 m.²/g., it is obvious that, in the relatively short period of 12 hours (average) conditions within the cracking unit had caused the catalyst surface area to decrease from 600 to 160 sq. m./g. Only about 2 percent of the catalyst was found to have a surface area as large as about 220 sq. m./g. Other samples taken at later times, such as 7 and 35 days after the injection of the tagged catalyst, indicate a further, although much slower, decrease of surface area, which reached for the particular catalyst tested, a value of about 100 sq. m./g. in a period of approximately 50 days.

Since different catalysts, or even catalysts of the same type but of different origin, are often subject to deactivation at widely different rates, the method of the present invention can be advantageously applied to compare said catalysts with a view to evaluating their deactivation characteristics and selecting the one capable of giving the most efficient and/or economic service. Thus, if it is desired to compare three catalysts X, Y and Z, the method described above may be applied to each one of them in sequence, and said catalysts evaluated from the results obtained, such chiefly as their respective deactivation curves.

Since, however, such procedure is relatively time-consuming, and since there is in this case no positive assurance that the several catalysts being compared are actually tested under rigorously identical conditions in the cracking unit, the above-described method of the present invention (which may be called the single-tagging method) may be modified to a multiple-tagging method permitting a simultaneous testing of several catalysts.

*Example II*

Three small batches of three catalysts of different nature or origin, were tagged each with a different isotope. For example, catalyst X was tagged with cerium–144, catalyst Y with chromium–51 and Z with scandium–46. The tagged batches were injected simultaneously in the cracking unit as described in Example I. The system was then sampled, the samples fractionated and the fractions counted for radioactivity in the manner described hereinabove. However, advantage was taken of the fact that the principal gamma ray emitted by cerium–144 has an energy of 0.13 mev., that of chromium–51 an energy of 0.32 mev., and those of scandium–46 energies of 0.89 and 1.12 mev. In counting the fractionated samples by means of the equipment of Figs. 1 or 2, the pulse height analyzer 8 was set so as to discriminate between the pulse height ranges corresponding to these energies. Thus, a large fraction of the Ce$^{144}$ was directed by pulse analyzer 8 to channel C1 of the scaler 9, a large fraction of Cr$^{51}$ pulses to channel C2, and a large fraction of Sc$^{46}$ pulses to channel C3. The scaler 9 thus counted separately the pulses predominantly due to each of the tagging materials used. It is understood that the counting rate found in each of the channels is corrected for the Compton scattering pulses found therein which are not due to the proper isotope. For example, the true Ce$^{144}$ counting rate of channel C1 is found by correcting the actual counting rate for the Cr$^{51}$ and Sc$^{46}$ Compton scattering pulses found in said channel C1. Counting rates of channels C2 and C3 are similarly corrected. It is obvious that the essential step in these measurements resides in the application of the scintillation counter, since the magnitudes of the output electrical pulses of such counter are directly proportional to the amount of energy expended in the crystal by the impinging gamma ray photon. This is not true, for example, of the Geiger counter, which produces electrical pulses of the same magnitude regardless of the energy of the gamma ray photons to which said pulses are due.

By following the procedure outlined in Example I, it may thus be possible to determine, for example, that by the end of 20 days catalyst X has an average surface area of 120 sq. m./g., catalyst Y a surface area of 210 sq. m./g., and catalyst Z a surface area of 150 sq. m./g. Catalyst Y is thus found to be, under certain conditions, the most desirable of the three.

It has further been found that the severe initial deactivation of fresh catalyst in a commercial unit which is detectable and measurable by means of the present method can be avoided or minimized by means of a mild, controlled, pre-deactivation of fresh catalyst to an intermediate surface area. Methods such as described in U.S. Patents 2,698,305; 2,375,757; 2,484,258, etc. may be used for this purpose.

Substantially the same technique as described above may be used when it is desired to study catalyst attrition, that is, a gradual decrease in catalyst particle size, which may or may not be accompanied by deactivation or other undesirable phenomena, such as an increased stack loss. In such case, however, the sink-float fractionation methods are preferably replaced by other separation methods, such, for example, as passing the catalyst over a sieve or a plurality of calibrated sieves. It is also obvious that the method can equally well be applied to the study of catalyst behaviour or properties other than attrition or deactivation, for example, catalyst mixing, catalyst loss rates, catalyst transport rates, residence times, fines retention, and the like.

This may be briefly outlined with reference to the following examples:

*Example III*

10 lbs. of equilibrium catalyst, withdrawn from the inventory of the unit of Fig. 3 were tagged with 2 mc. of scandium–46 by the hydrogen ion method referred to hereinabove, and were then injected back into the system. The injection, which was carried out in a period of 5 seconds, was made into the downpipe 19, carrying the spent catalyst from the reactor to the regenerator, at a point 40 just ahead of the regenerator. Continuous half-minute duration samples were then taken at each of a plurality of sampling points, followed by half-minute duration samples at 15, 20, 25, 30 and 60 minutes after injection. The samples were taken through a port 45 in pipe 17, carrying the regenerated catalyst; a port 47 near the top of the regenerator dense bed, and a port 49 in the spent catalyst pipe 19 ahead of the injection point 40.

Figure 5:
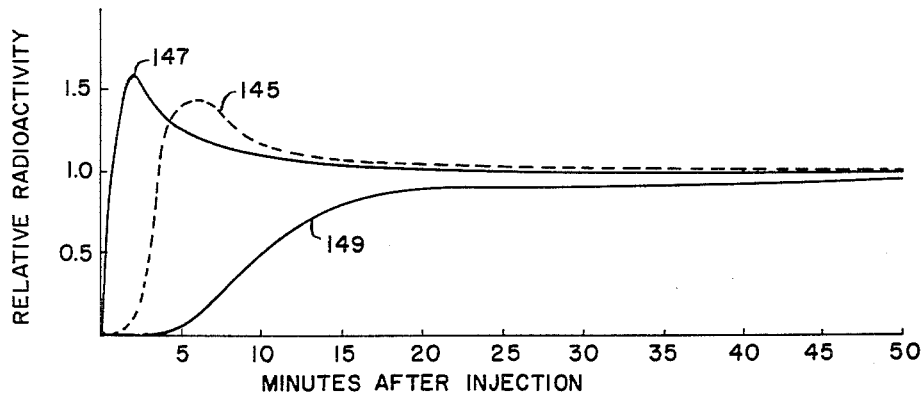
Figs. 5 and 6 are graphs pertaining to measurements of catalyst behavior by the method of the present invention.

The radioactivity of the samples was then measured and the results obtained were plotted in the form of the curves indicating the relative radioactivity of the catalyst samples against the time elapsed since the injection of the tagged catalyst, as shown by the graph of Fig. 5.

It will be seen from curve 147, based on data obtained from samples taken at port 47, that tagged catalyst concentration reached a maximum value in the regenerator dense bed in about one minute, the peak value corresponding to mixing of the injected tagged catalyst with about 500 tons of the 600-ton regenerator inventory. As indicated by curve 145, based on data obtained at port 45, the tagged catalyst did not appear in the regenerated catalyst standpipe 17 for about two minutes after the injection, and did not reach maximum concentration until about 5 minutes after the injection. Similarly, as seen from curve 149, based on data obtained at port 49, tagged catalyst did not appear at port 49 in the spent catalyst standpipe 19 until about 5 minutes after injection. Thereafter, the concentration slowly rose to the completely mixed value for the entire unit.

The measurements described above can be repeated while injecting the tagged catalyst into the system at other points, for example at a point 50 in the regenerated catalyst standpipe 17, or other suitable points. When the data thus obtained are combined, a reasonably complete picture of the catalyst mixing behavior in the cracking unit can be obtained. The data supply an accurate measure of the distribution of catalyst residence times in the reactor-stripper and in the regenerator, providing insight, when combined with information on the chemical kinetics of coke deposition in the reactor and coke burnoff in the regenerator, into the distribution of catalyst activities in the unit.

Another quantity which can be determined by the present method from the measurement of the radioactivity level of the catalyst after complete mixing throughout the unit is the total inventory of the unit. Knowing the amount of radioactivity matter injected and thus the radioactivity imparted to the catalyst, the value of the inventory can be determined by calculating the final isotope dilution. Thus in the measurements described in the present example, the total inventory value obtained by isotope dilution calculation differed only by one ton from the independent refinery value of 864 tons. In general, the difference between the inventory value obtained by the present method and the refinery value is less than one percent.

*Example IV*

Figure 6:
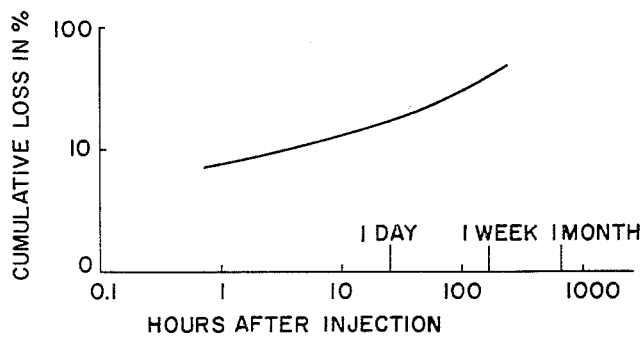

The application of the present method to stack loss rate measurements, that is to the determination of the loss rate of fresh catalyst from the stack of the regenerator can be described with regard to the following example. 5 lbs. of fresh catalyst, tagged with 2 mc. of cerium-144, were injected in a one-minute period into the dense bed of the regenerator of a relatively small cracking unit operating with a total inventory of about 60 tons and a stack loss rate of about 1 ton per day. Samples were taken from the stack at intervals of 30 or 60 minutes for the first five hours after injection, and intermittently thereafter for four weeks. Approximately 150 grams per hour of fines were collected by means of suitable filters. The radioactivity of the samples was measured with the scintillation well counter of Fig. 2. The data thus obtained are shown in the form of the graph of Fig. 6. It is seen that the initial stack loss is very high, amounting to about 8% during the first hour, 24% during the first day, 32% during the first two days and 37% during the first three days.

We claim as our invention:

1. A method for simultaneously measuring the rates of deactivation by surface area loss of a plurality of different cracking catalysts, comprising the steps of tagging a predetermined amount of each of said catalysts with a different isotope, said isotopes each emitting gamma rays of different energy distinguishable from that of the other isotopes, injecting the tagged catalysts into a cracking unit, letting the tagged catalysts circulate through the cracking unit in admixture with the equilibrium catalyst present therein for a desired period of time, withdrawing samples of catalyst from the unit, fractionating said samples into a plurality of fractions of known different surface areas, and measuring the radioactivity of said fractions by separately counting the pulses due to each of the gamma rays of different energy emitted by the different tagging isotopes.

2. A method for simultaneously measuring the rates of deactivation by pore volume of a plurality of different cracking catalysts, comprising the steps of tagging a predetermined amount of each of said catalysts with a different isotope, said isotopes each emitting gamma rays of different energy distinguishable from that of the other isotopes, injecting the tagged catalysts into a cracking unit, letting the tagged catalysts circulate through the cracking unit in admixture with the equilibrium catalyst present therein for a desired period of time, withdrawing samples of catalyst from the unit, fractionating said samples into a plurality of fractions of known different pore volume, and measuring the radioactivity of said fractions by separately counting the pulses due to each of the gamma rays of different energy emitted by the different tagging isotopes.

3. A method for simultaneously measuring the rates of attrition by particle size of a plurality of different cracking catalysts, comprising the steps of tagging a predetermined amount of each of said catalysts with a different isotope, said isotopes each emitting gamma rays of different energy distinguishable from that of the other isotopes, injecting the tagged catalysts into a cracking unit, letting the tagged catalysts circulate through the cracking unit in admixture with the equilibrium catalyst present therein for a desired period of time, withdrawing samples of catalyst from the unit, fractionating said samples into a plurality of fractions of known different particle sizes, and measuring the radioactivity of said fractions by separately counting the pulses due to each of the gamma rays of different energy emitted by the different tagging isotopes.

4. A method for measuring the aging characteristics of a cracking catalyst, comprising the steps of tagging a predetermined amount of the catalyst with a radioactive material, introducing the tagged catalyst into a cracking unit, maintaining said introduced catalyst in the cracking unit for a desired period of time thereby causing it to circulate through the cracking unit and become thoroughly interspersed with the equilibrium catalyst therein, withdrawing a sample of the catalyst from the unit at the end of the aforesaid period of time, fractionating said sample into a plurality of fractions of known and different physical properties which are correlatable with aging characteristics, and measuring the radioactivity of each of said fractions thereby correlating the radioactivity with the aforesaid known physical property of each of said fractions and therefore also with the aging characteristics thereof.

5. A method for measuring the deactivation of a cracking catalyst by surface area loss, comprising the steps of tagging a predetermined amount of the catalyst with a radioactive material, introducing the tagged catalyst into a cracking unit, maintaining said introduced catalyst in the cracking unit for a desired period of time thereby causing it to circulate through the cracking unit and become thoroughly interspersed with the equilibrium catalyst therein, withdrawing a sample of the catalyst from the unit at the end of the aforesaid period of time, fractionating said sample into a plurality of fractions of known and different surface area ranges which are correlatable with the deactivation of the catalyst, and measuring the radioactivity of each of said fractions thereby correlating the radioactivity with the aforesaid surface area range of each of said fractions and therefore also with the deactivation thereof.

6. A method for measuring the deactivation of a cracking catalyst by pore volume loss, comprising the steps of tagging a predetermined amount of the catalyst with a radioactive material, introducing the tagged catalyst into a cracking unit, maintaining said introduced catalyst in the cracking unit for a desired period of time thereby causing it to circulate through the cracking unit and become thoroughly interspersed with the equilibrium catalyst therein, withdrawing a sample of the catalyst from the unit at the end of the aforesaid period of time, fractionating said sample into a plurality of fractions of known and different pore volume ranges which are correlatable with the deactivation of the catalyst, and measuring the radioactivity of each of said fractions thereby correlating the radioactivity with the aforesaid pore volume range of each of said fractions and therefore also with the deactivation thereof.

7. The method of claim 6 wherein the fractionation of the sample is effected by the sink-float method.

8. A method for measuring the aging characteristics of a cracking catalyst by particle size loss, comprising the steps of tagging a predetermined amount of the catalyst with a radioactive material, introducing the tagged catalyst into a cracking unit, maintaining said introduced catalyst in the cracking unit for a desired period of time thereby causing it to circulate through the cracking unit and become thoroughly interspersed with the equilibrium catalyst therein, withdrawing a sample of the catalyst from the unit at the end of the aforesaid period of time, fractionating said sample into a plurality of fractions of known and different particle size ranges which are correlatable with aging characteristics, and measuring the radioactivity of each of said fractions thereby correlating the radioactivity with the aforesaid particle size range of each of said fractions and therefore also with the aging characteristics thereof.

9. A method for simultaneously measuring the aging characteristics of a plurality of different cracking catalysts, comprising the steps of tagging a predetermined amount of each of said catalysts with a different isotope, said isotopes each emitting gamma rays of different energy level distinguishable from that of the other isotopes, introducing the tagged catalysts into a cracking unit, maintaining said tagged catalysts in the cracking unit for a desired period of time thereby causing them to circulate through the cracking zone and become intermixed with the equilibrium catalyst therein, withdrawing a sample of catalyst from the unit, fractionating said sample into a plurality of fractions of known and different physical properties which are correlatable with aging characteristics, and measuring the radioactivity of said fractions by separately counting the pulses due to each of the gamma rays of different energy emitted by the different tagging isotopes.

References Cited in the file of this patent

UNITED STATES PATENTS

| 2,567,207 | Hoge | Sept. 11, 1951 |
| 2,631,968 | Peery | Mar. 17, 1953 |

OTHER REFERENCES

Radioactive Isotopes as Tracers by Kramer, published in Power Plant Engineering, November 1947, pp. 105–109.

Radiosotopes in Physical and Chemical Research by Calkins, published by Reinhold Publishing Corp., New York (1953), pp. 71–85.

"Using Tracers in Refinery Control," by D. E. Hull, Nucleonics, vol. 13, No. 4, April 1955, pp. 18–21.

Radioisotopes in Petroleum Refining, Research and Analysis by Hull et al., a paper presented to the Geneva Conference in August 1955, printed in Peaceful Uses of Atomic Energy, United Nations, New York (1956), vol. 15, pp. 199–201.